United States Patent
Shi et al.

(10) Patent No.: US 12,366,379 B2
(45) Date of Patent: Jul. 22, 2025

(54) CONTROL METHOD AND APPARATUS FOR COMPRESSION SYSTEM, AND AIR ENERGY HEAT PUMP WATER HEATER

(71) Applicant: Gree Electric Appliances, Inc. of Zhuhai, Guangdong (CN)

(72) Inventors: Fan Shi, Guangdong (CN); Guang Ouyang, Guangdong (CN); Gaoling Wu, Guangdong (CN); Guojian Bai, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 46 days.

(21) Appl. No.: 18/280,491

(22) PCT Filed: Jan. 10, 2022

(86) PCT No.: PCT/CN2022/070983
§ 371 (c)(1),
(2) Date: Sep. 6, 2023

(87) PCT Pub. No.: WO2023/273291
PCT Pub. Date: Jan. 5, 2023

(65) Prior Publication Data
US 2024/0151433 A1 May 9, 2024

(30) Foreign Application Priority Data
Jun. 28, 2021 (CN) .......................... 202110718242.4

(51) Int. Cl.
F24H 4/04 (2006.01)
F25B 30/06 (2006.01)
(Continued)

(52) U.S. Cl.
CPC ............... F24H 4/04 (2013.01); F25B 30/06 (2013.01); F25B 41/31 (2021.01); F25B 49/02 (2013.01); *F25B 2600/2513* (2013.01)

(58) Field of Classification Search
CPC ..... F25B 2600/2513; F25B 9/008; F24H 4/04
See application file for complete search history.

(56) References Cited

U.S. PATENT DOCUMENTS 9,803,897 B2 * 10/2017 Furui ...................... F25B 30/02
2008/0023563 A1 1/2008 Tamura
(Continued)

FOREIGN PATENT DOCUMENTS

CN 101113834 A 1/2008
CN 101410677 A 4/2009
(Continued)

OTHER PUBLICATIONS

CN-103808010-A Translation (Year: 2014).*
CN-104807183-A Translation (Year: 2014).*

*Primary Examiner* — David J Teitelbaum
(74) *Attorney, Agent, or Firm* — The Webb Law Firm (57) ABSTRACT

A control method and apparatus for a compression system, and an air energy heat pump water heater. The compression system includes a compressor, a first electronic expansion valve, and a second electronic expansion valve. The method includes executing a first control step at least once, including determining a first target step number of the first electronic expansion valve; after the first electronic expansion valve is controlled to operate for a first time period according to the first target step number, determining a temperature difference between the current exhaust temperature of the compressor and the current highest water temperature of the water tank; when the temperature difference is less than a first preset value, decreasing the first target step number by a first correction step number; and controlling the first
(Continued)

electronic expansion valve to operate according to the decreased first target step number.

20 Claims, 5 Drawing Sheets

(51) Int. Cl.
*F25B 41/31* (2021.01)
*F25B 49/02* (2006.01)

(56) References Cited

U.S. PATENT DOCUMENTS

| | | | |
|---|---|---|---|
| 2009/0165482 A1* | 7/2009 | Ko | F25B 1/10 62/222 |
| 2009/0199581 A1 | 8/2009 | Ushijima et al. | |
| 2009/0260380 A1 | 10/2009 | Okamoto | |
| 2010/0205987 A1* | 8/2010 | Okazaki | F25B 9/008 62/190 |
| 2011/0072840 A1* | 3/2011 | Itagaki | F25B 13/00 62/513 |
| 2011/0225999 A1* | 9/2011 | Okaichi | F25B 1/10 62/222 |
| 2012/0017620 A1* | 1/2012 | Ogata | F25B 9/06 62/222 |
| 2016/0320111 A1* | 11/2016 | Saikusa | F25B 49/022 |

FOREIGN PATENT DOCUMENTS

| | | | |
|---|---|---|---|
| CN | 102345915 A | | 2/2012 |
| CN | 102374714 A | | 3/2012 |
| CN | 103808010 A | * | 5/2014 |
| CN | 104024763 A | | 9/2014 |
| CN | 104807183 A | * | 7/2015 |
| CN | 107062720 A | | 8/2017 |
| CN | 107388623 A | | 11/2017 |
| CN | 109668350 A | | 4/2019 |
| CN | 110440420 A | | 11/2019 |
| CN | 112781266 A | | 5/2021 |
| EP | 3431896 A1 | | 1/2019 |
| JP | 2000346448 A | | 12/2000 |
| JP | 2012233626 A | | 11/2012 |
| WO | 2017158782 A1 | | 9/2017 |

* cited by examiner

CONTROL METHOD AND APPARATUS FOR COMPRESSION SYSTEM, AND AIR ENERGY HEAT PUMP WATER HEATER

CROSS-REFERENCE TO RELATED APPLICATIONS

The application is the United States national phase of International Application No. PCT/CN2022/070983 filed Jan. 10, 2022, and claims priority to Chinese Patent Application No. 202110718242.4 filed on Jun. 28, 2021, the disclosures of which are hereby incorporated by reference in their entireties.

BACKGROUND OF THE INVENTION

Field of the Invention

The present disclosure relates to a control method and apparatus for a compression system, and an air energy heat pump water heater.

DESCRIPTION OF RELATED ART

The air energy heat pump water heater is referred to as "the fourth-generation water heater" after the gas water heater, the electric water heater, and the solar water heater.

In recent years, the air energy heat pump water heater has been more and more widely applied due to its advantages of high efficiency and energy-saving, environmental protection, safety, comfort, and convenient installation.

SUMMARY OF THE INVENTION

According to one aspect of the embodiments of the present disclosure, a control method for a compression system is provided. The compression system comprises a compressor provided between a first outdoor heat exchanger and a second heat exchanger of a water tank, a first electronic expansion valve provided between the second heat exchanger and a flash evaporator, and a second electronic expansion valve provided between the flash evaporator and the outdoor first heat exchanger. The control method comprises performing a first control step for at least one time, and performing the first control step for each time comprises: determining a first target step number of the first electronic expansion valve; determining a temperature difference between a current exhaust temperature of the compressor and a current maximum water temperature of a water tank, after controlling the first electronic expansion valve to operate with the first target step number for a first time period; decreasing the first target step number by a first correction step number in a case where the temperature difference is less than a first preset value, wherein the first preset value is greater than 0 degree Celsius and the first correction step number is greater than 0 step; and controlling the first electronic expansion valve to operate with the decreased first target step number.

According to another aspect of the embodiments of the present disclosure, a control apparatus for a compression system is provided. The compression system comprises a compressor provided between an outdoor first heat exchanger and a second heat exchanger of a water tank, a first electronic expansion valve provided between the second heat exchanger and a flash evaporator, and a second electronic expansion valve provided between the flash evaporator and the outdoor first heat exchanger. The control apparatus is configured to perform a first control step for at least one time, the control apparatus comprising: a first determining module configured to determine a first target step number of the first electronic expansion valve in the first control step for each time; a second determining module configured to determine a temperature difference between a current exhaust temperature of the compressor and a current maximum water temperature of a water tank, after the first electronic expansion valve is controlled to operate with the first target step number in the first control step for each time; a correction module configured to decrease the first target step number by a first correction step number in a case where the temperature difference is less than a first preset value in the first control step for each time, wherein the first preset value is greater than 0 degree Celsius and the first correction step number is greater than 0 step; and a control module configured to control the first electronic expansion valve to operate with the decreased first target step number in the first control step for each time.

According to a further aspect of the embodiments of the present disclosure, a control apparatus for a compression system is provided. The control apparatus comprises: a memory; and a processor coupled to the memory and configured to perform the control method for a compression system according to any of the above embodiments based on instructions stored in the memory.

According to still another aspect of the embodiments of the present disclosure, an air energy heat pump water heater is provided. The heater comprises: a control apparatus of the compression system according to any of the above embodiments; and the compression system.

According to yet another aspect of the embodiments of the present disclosure, a computer-readable storage medium comprising computer program instructions is provided, wherein the computer program instructions, when executed by a processor, implement the method according to any of the above embodiments.

The technical solutions of the present disclosure will be further described in detail below by way of the accompanying drawings and embodiments.

BRIEF DESCRIPTION OF THE DRAWINGS

To explain the embodiments of the present disclosure or the technical solutions in the relative art more clearly, the accompanying drawings required to be used in the description of the embodiments or the relative art will be briefly introduced below. It is apparent that, the accompanying drawings illustrated below are merely some of the embodiments of the present disclosure. For those of ordinary skill in the art, other accompanying drawings may also be obtained according to these accompanying drawings on the premise that no inventive effort is involved.

DESCRIPTION OF THE INVENTION

The technical solutions in the embodiments of the present disclosure will be clearly and completely described below in conjunction with the accompanying drawings in the embodiments of the present disclosure. Apparently, the embodiments described are merely some of the embodiments of the present disclosure, rather than all the embodiments. Based on the embodiments of the present disclosure, all the other embodiments obtained by those of ordinary skill in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatus shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same item in the subsequent accompanying drawings.

The performance of the air energy heat pump water heater is greatly affected by the environment temperature, especially in a place where the environment temperature is very low in winter. The air energy heat pump water heater has a low efficiency when heating with a high water temperature (for example, above 60° C.)

In the art known to the inventors, the efficiency of the air energy heat pump water heater can be improved using a compression system comprising a two-stage electronic expansion valve.

Figure 1:
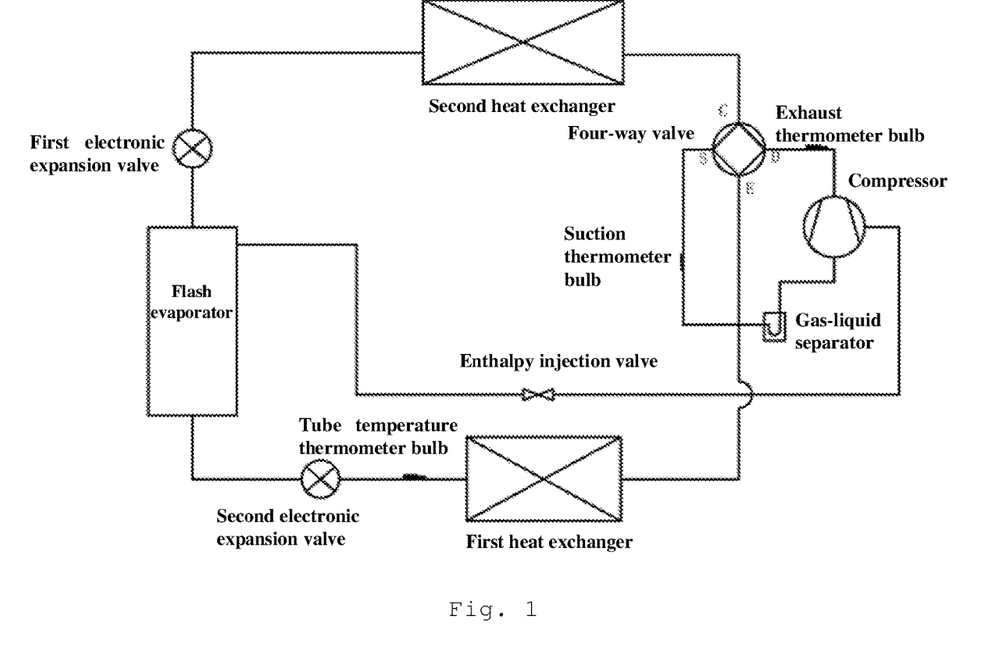
FIG. 1 is a structural schematic view showing a compression system according to some embodiments of the present disclosure.

FIG. 1 is a structural schematic view showing a compression system according to some embodiments of the present disclosure.

As shown in FIG. 1, the compression system comprises a compressor provided between an outdoor first heat exchanger and a second heat exchanger of a water tank, a first electronic expansion valve (a first-stage electronic expansion magnetic valve) provided between the second heat exchanger and a flash evaporator, and a second electronic expansion valve (a second-stage electronic expansion magnetic valve) provided between the flash evaporator and the first heat exchanger. In addition, FIG. 1 also shows a four-way valve in the compression system, the port C of the four-way valve is connected to the second heat exchanger, the port D of the four-way valve is connected to an air outlet of the compressor, the port E of the four-way valve is connected to the first heat exchanger, and the port S of the four-way valve is connected to an air inlet of the compressor via a gas-liquid separator.

Next, the heating process of the compression system is introduced in conjunction with FIG. 1.

The refrigerant vapor from the compressor enters the second heat exchanger of the water tank after passing through the four-way valve. The refrigerant vapor condenses into liquid after heating the water in the water tank, the liquid is throttled to a wet vapor with an intermediate pressure after passing through the first electronic expansion valve and wet vapor enters the flash evaporator. In the flash evaporator, a part of the refrigerant is flashed to become saturated refrigerant vapor, and the other part of the refrigerant becomes saturated liquid. The saturated refrigerant vapor is sucked by an intermediate-pressure cavity of the compressor after passing through the enthalpy injection valve, and the saturated liquid is throttled after passing through the second electronic expansion valve to enter the outdoor first heat exchanger and absorb heat to become a superheated gas. The superheated gas is sucked and compressed by a low-pressure cavity of the compressor after passing through the gas-liquid separator to enter the intermediate-pressure cavity, and compressed into a high-temperature and high-pressure gas after being mixed with the gas in the intermediate-pressure cavity. The high-temperature and high-pressure gas is then condensed again after entering the second heat exchanger of the water tank. The cycle is thus repeated so that the water in the water tank can be heated.

The inventors have noticed that, in a case where the water remaining in the water tank has a high temperature and the outdoor environment temperature is low, the refrigerant easily migrates to the outdoor first heat exchanger and the compressor. At this time, if the water tank is filled with water and heated, the compression system might operate by carrying a liquid, thereby affecting the reliability of the compression system. Further, the refrigerant entering the outdoor first heat exchanger is insufficient, which leads to a low heating efficiency of the compression system.

In view showing this, the embodiments of the present disclosure provide the following technical solutions.

The control method for a compression system provided by some embodiments of the present disclosure comprises performing first control step for at least one time, and the specific implementation of performing the first control step will be described below in conjunction with FIG. 2.

Figure 2:
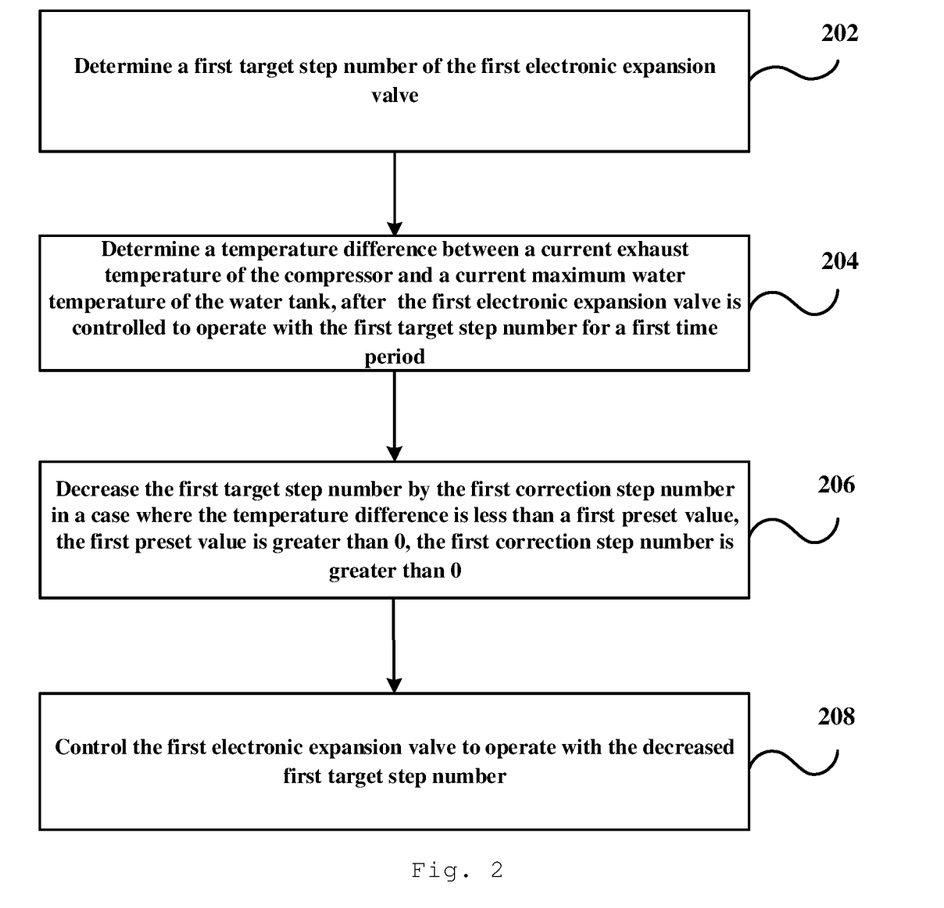
FIG. 2 is a flow chart of performing a first control step according to some embodiments of the present disclosure.

FIG. 2 is a flow chart of performing a first control step according to some embodiments of the present disclosure.

At step 202, a first target step number of the first electronic expansion valve is determined.

In some embodiments, the first target step number is determined according to the current environment temperature and the current average water temperature of the water tank. Hereinafter, detailed description will be made in conjunction with some embodiments.

At step 204, a temperature difference between a current exhaust temperature of the compressor and a current maximum water temperature of the water tank is determined, after the first electronic expansion valve is controlled to operate with the first target step number for a first time period.

It should be understood that, in some embodiments, the first time period is adjusted according to actual conditions, for example, is greater than or equal to 5 minutes.

For example, referring to FIG. 1, the current exhaust temperature of the compressor is obtained by the temperature of the exhaust thermometer bulb arranged on the exhaust pipe of the compressor.

The current maximum water temperature of the water tank is obtained by arranging a thermometer bulb at a specific position of the water tank, for example. In some embodiments, the maximum water temperature is the temperature of a thermometer bulb arranged at a certain position of the water tank. The certain position is closer to the water outlet of the water tank than the water inlet of the water tank. For example, the temperature of the water in the upper part of the water tank is higher than the temperature of the water in the lower part of the water tank, the water outlet is located at the upper part of the water tank, the water inlet is located at the lower part of the water tank, and at this time, the thermometer bulb is arranged at the upper part of the water tank. Here, the temperature of the thermometer bulb can reflect the maximum temperature of the water in the upper part of the water tank.

In some embodiments, the water tank is also provided with another thermometer bulb which is arranged to be closer to the water inlet of the water tank than the water outlet of the water tank. For example, the another thermometer bulb is located at the lower part of the water tank. It should be understood that the temperature of the another thermometer bulb can reflect the temperature of the water in the lower part of the water tank.

At step 206, the first target step number is decreased by a first correction step number, in a case where the temperature difference is less than a first preset value. Here, the first preset value is greater than 0 degree Celsius, and the first correction step number is greater than 0 step.

In some embodiments, the first preset value is 10 degrees Celsius.

At step 208, the first electronic expansion valve is controlled to operate with the decreased first target step number.

For example, the first target step number before correction is K1m and the first correction step number is X1, and the decreased first target step number is K1m-X1. It should be understood that the first correction step number is less than the first target step number, that is, the decreased first target step number is still greater than 0 step. In some embodiments, the maximum first correction step number is 120 steps.

In the above embodiments, in the case where the temperature difference between the current exhaust temperature of the compressor and the current maximum water temperature of the water tank is less than the first preset value which is greater than 0 degree Celsius, the first electronic expansion valve is controlled to operate with the first target step number decreased by the first correction step number. In this way, excessive refrigerant is avoided to enter the pipeline between the flash evaporator and the compressor, thereby decreasing the possibility of the compressor operating by carrying a liquid and improving the reliability of the compression system. In addition, the refrigerant entering the pipeline between the flash evaporator and the outdoor first heat exchanger is relatively increased, to avoid a much low suction pressure of the compressor and improve the heating efficiency of the compression system. In this way, the reliability and heating efficiency of the compression system is balanced.

Hereinafter, for the sake of brevity, the temperature difference means the temperature difference between the current exhaust temperature of the compressor and the current maximum water temperature of the water tank unless otherwise specified.

In some embodiments, the control method for a compression system comprises performing the first control step shown in FIG. 2 for N times. Here, the temperature difference determined in the first control for each time is less than the first preset value, and the first correction step number in the first control step for i-th time is greater than the first correction step number in the first control step for (i−1)-th time, where N is greater than or equal to 2, and $2 \leq i \leq N$. In other words, the first correction step number decreased in the next first control step is larger than the first correction step number in the previous first control step. In this way, in the case where the temperature difference is less than the first preset value, the water tank can be heated more rapidly, and the possibility of the compressor operating by carrying a liquid is further reduced, thereby further improving the reliability of the compression system.

In some embodiments, in a case where i is any integer from 2 to N, the first difference between the first correction step number in the first control step for i-th time and the first correction step number in the first control step for (i−1)-th time is the same. For example, the first correction step number in the control step for the first time is X1, the first correction step number in the control step for the second time is 2X1, and the first correction step number in the control step for the third time is 3X1, and so forth. In this way, it is more convenient for the control to improve the correction speed, thereby controlling the opening degree of the first electronic expansion valve to be the target opening degree, that is, the decreased first target step number, more rapidly.

With the gradually increased exhaust temperature of the compressor, the temperature difference between the exhaust temperature of the compressor and the maximum temperature of the water tank will gradually change from less than the first preset value to greater than or equal to the first preset value, and subsequent control will be described below.

In some embodiments, after the above first control step for at least one time is performed, a second control step for at least one time is performed.

Figure 3:
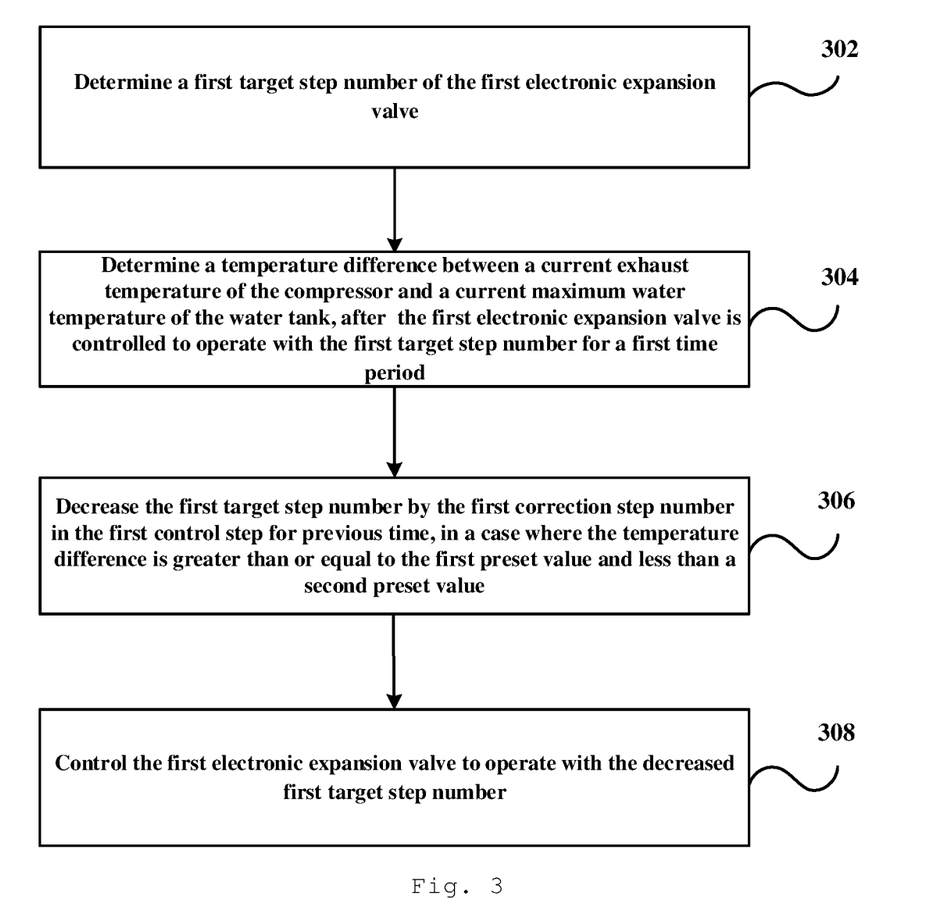
FIG. 3 is a flow chart of performing a second control step according to some embodiments of the present disclosure.

FIG. 3 is a flow chart of performing a second control step according to some embodiments of the present disclosure. For some steps in FIG. 3, reference can be made to the relevant description of FIG. 2, and description will no longer be made in detail here.

At step 302, a first target step number of the first electronic expansion valve is determined.

At step 304, a temperature difference is determined after the first electronic expansion valve is controlled to operate with the first target step number for a second time period.

In some embodiments, the second time period is the same as the first time period.

At step 306, the first target step number is decreased by the first correction step number in the first control step for previous time, in a case where the temperature difference is greater than or equal to the first preset value and less than the second preset value.

Here, the second preset value is greater than the first preset value. In some embodiments, the second preset value is 15 degrees Celsius, and the first preset value is 10 degrees Celsius.

It should be understood that, for the second control step, the first control step for previous time is the first control step performed for final time before. In the second control step for each time, the first target step number is decreased by the first correction step number in the first control step for previous time each time after the first target step number is determined. In other words, the first target step number is corrected with the same step in the second control for each time.

At step 308, the first electronic expansion valve is controlled to operate with the decreased first target step number.

In the above embodiments, the temperature difference has changed from less than the first preset value to greater than or equal to the first preset value and less than the second preset value through the first control step. At this time, the first correction step number is not increased to avoid an excessive small opening degree of the first electronic expansion valve which reduces the heating efficiency.

With a further increased exhaust temperature of the compressor, the temperature difference between the exhaust temperature of the compressor and the maximum temperature of the water tank will gradually change to be greater than or equal to the second preset value, and subsequent control will be described below.

In some embodiments, after the above second control step for at least one time is performed, a third control step for at least one time is performed.

Figure 4:
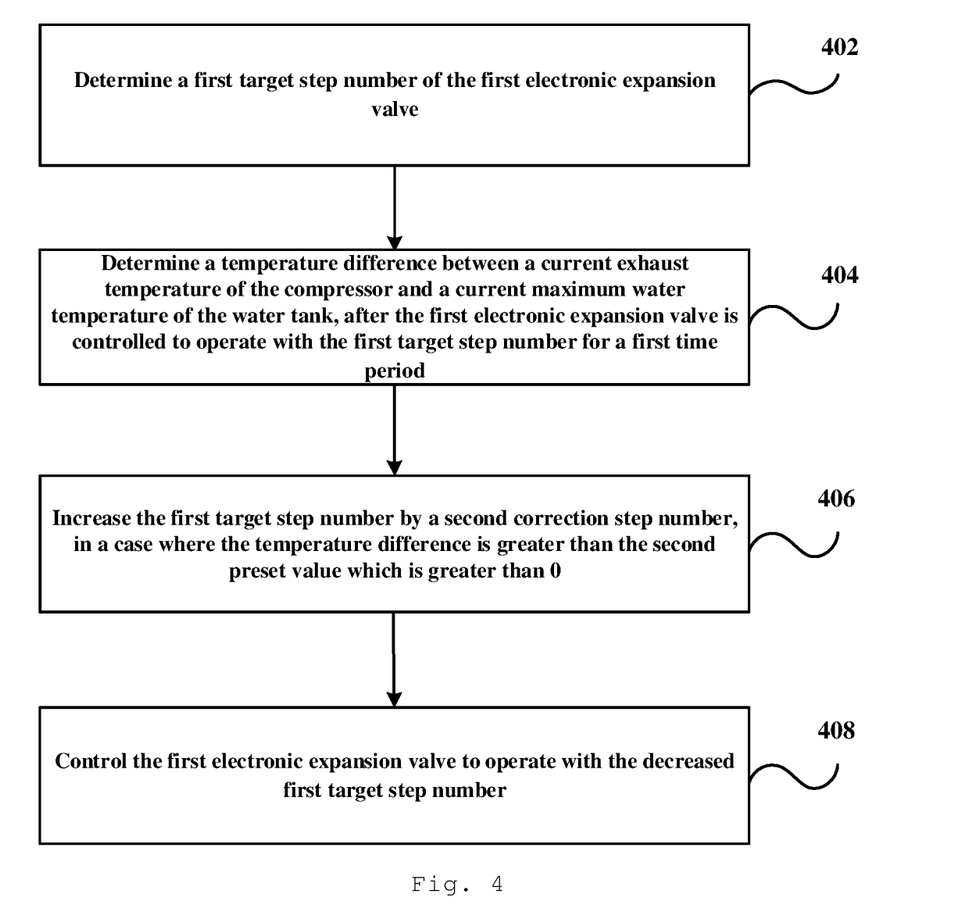
FIG. 4 is a flow chart of performing a third control step according to some embodiments of the present disclosure.

FIG. 4 is a flow chart of performing a third control step according to some embodiments of the present disclosure. Similarly, for some steps in FIG. 4, reference can be made to the relevant description of FIG. 2, which will not be described in detail here.

At step 402, a first target step number of the first electronic expansion valve is determined.

At step 404, the temperature difference is determined after the first electronic expansion valve is controlled to operate with the first target step number for a third time period.

In some embodiments, the third time period is the same as the first time period. In some embodiments, the third time period, the second time period and the first time period are all the same.

At step 406, the first target step number is increased by a second correction step number in a case where the temperature difference is greater than or equal to a second preset value. Here, the second correction step number is greater than 0 step.

At step 408, the first electronic expansion valve is controlled to operate with the increased first target step number.

In the above embodiments, in the case where the temperature difference is greater than or equal to the second preset value, the first target step number is increased by the second correction step number, thereby improving the heating efficiency of the compression system.

In some embodiments, the third control step is performed for M times, where M is an integer greater than or equal to 2. The temperature difference determined in the third control step for each time is greater than or equal to the second preset value, and the second correction step number in the third control step for j-th time is greater than the second correction step number in the third control step for (j−1)-th time, where 2≤j≤M. In other words, the second correction step number increased in the third control step for the next time is greater than the second correction step number increased in the third control step for the previous time. Thus, in the case where the temperature difference is greater than or equal to the second preset value, the heating efficiency of the compression system is further improved.

In some embodiments, in the case where j is any integer from 2 to M, the second difference between the second correction step number in the third control step for j-th time and the second correction step number in the third control step for (j−1)-th time is the same. For example, the third correction step in the third control step for the first time is X2, the third correction step in the second third control step for the second time is 2X2, and the third correction step in the third control step for the third time is 3X2, and so forth.

In this way, it is more convenient for the control to improve the correction speed, thereby controlling the opening degree of the first electronic expansion valve to be the target opening degree, that is, the increased first target step number, more rapidly.

The inventors have also noticed that when the compression system is controlled, the initial opening degrees of the first electronic expansion valve and the second electronic expansion valve will affect the heating efficiency and reliability of the compression system. To balance the heating efficiency and reliability of the compression system more favorably, the embodiments of the present disclosure also provide the following technical solutions.

In some embodiments, the first electronic expansion valve and the second electronic expansion valve are first controlled to start operating with respective initial steps before the above first control step for at least one time is performed. The specific control is as follows.

First, in response to the startup of the compressor, a first initial step number of the first electronic expansion valve and a second initial step number of the second electronic expansion valve are determined according to a current environment temperature and a current average water temperature of the water tank.

For example, the current average water temperature of the water tank is obtained by calculating an average value of the temperatures of one or more water thermometer bulbs arranged on the water tank.

For example, the current environment temperature is obtained by an environment thermometer bulb arranged at the air inlet of the first heat exchanger on the air side. Alternatively, the location information of the compression system is obtained and the real-time environment temperature, obtained by networking, of the location of the compression system is taken as the current environment temperature.

Then, the first electronic expansion valve is controlled to start operating with the first initial step number, and the second electronic expansion valve is controlled to start operating with the second initial step number.

Subsequently, after a period of time, the first target step number of the first electronic expansion valve and the second target step number of the second electronic expansion valve are determined, and the first electronic expansion valve and the second electronic expansion valve are controlled to operate with respective target steps respectively. For example, after a first preset period (for example, 2 minutes), the first target step number of the first electronic expansion valve is first determined and the first electronic expansion valve is controlled to operate with the first target step number, and then after a second preset period (for example, 1 minute), the second target step of the second electronic expansion valve is determined and the second electronic expansion valve is controlled to operate with the second target step.

Some implementations of determining the first initial step number of the first electronic expansion valve according to the current environment temperature and the current average water temperature of the water tank will be introduced below.

In a case where the current environment temperature is less than the third preset value, or the current environment temperature is greater than or equal to the fourth preset value, the first initial step number is a fixed value. Here, the third preset value and the fourth preset value are greater than 0 degree Celsius, and the fourth preset value is greater than the third preset value. In some embodiments, the third preset value is 10 degrees Celsius, the fourth preset value is 30 degrees Celsius, and the fixed value ranges from 250 steps to 450 steps. In the case where the current environment temperature is within the above temperature range, the first initial step number of the first electronic expansion valve are set within the above step range, thus the opening degree of the first electronic expansion valve is maintained at an appropriate opening degree to avoid an excessive large or an excessive small opening degree, thereby balancing the heating efficiency and reliability of the compression system more favorably. In some embodiments, in the case where the current environment temperature is within the above temperature range, the fixed value of the initial steps of the first electronic expansion valve is set to 300 steps, thus the opening degree of the first electronic expansion valve is maintained at a more appropriate opening degree, thereby balancing the heating efficiency and reliability of the compression system more favorably.

In the case where the current environment temperature is greater than or equal to the third preset value and less than the fourth preset value, the first initial step number is determined according to the current average water temperature of the water tank.

In some embodiments, the first initial step number $K1_0$ is determined according to the following formula:

$$K1_0 = B1_0 + C1_0 \overline{T_w} + D1_0 (\overline{T_w} - 20)^2 + E1_0 (\overline{T_w} - 20)^3$$

In the above formula, $K1_0$ is an integer, $B1_0$, $C1_0$, $D1_0$ and $E1_0$ are constants, $\overline{T_w}$ is the current average water temperature of the water tank, $B1_0$ ranges from 267 to 310, $C1_0$ ranges from 4.3 to 6.1, $D1_0$ ranges from $-0.17$ to $-0.09$ and $E1_0$ ranges from 0.0006 to 0.0013.

By way of fitting analysis and experimental verification by the inventors, the first initial step number $K1_0$ determined according to the above formula is comparatively reasonable, which can reduce the possibility of the compressor operating by carrying a liquid without causing excessive small refrigerant entering the outdoor first heat exchanger, and meanwhile the first electronic expansion valve can be controlled to reach the subsequent target step more rapidly.

In some embodiments, $B1_0$ is 289, $C1_0$ is 5.2, $D1_0$ is $-0.13$, and $E1_0$ is 0.001, which makes the first initial step number $K1_0$ more reasonable.

Some implementations of determining the second initial step number of the second electronic expansion valve according to the current environment temperature and the current average water temperature of the water tank will be introduced below.

Ina case where the current environment temperature is greater than or equal to the fifth preset value, the second initial step number is positively correlated with the current environment temperature. In a case where the current environment temperature is less than the fifth preset value, the second initial step number is positively correlated with the average water temperature. Here, the fifth preset value is less than 0 degree Celsius. In some embodiments, the fifth preset value is $-5$ degrees Celsius.

The second initial step number is controlled according to the above method, making the second electronic expansion valve be at a comparatively reasonable opening degree, which balances the reliability and heating efficiency of the compression system.

As some implementations, in the case where the current environment temperature is greater than or equal to the fifth preset value, the second initial step number $K2_0$ is determined according to the following formula:

$$K2_0 = A2_0 + B2_0 T_e,$$

In the above formula, $K2_0$ is an integer, $A2_0$ and $B2_0$ are constants, $T_e$ is the current environment temperature, $A2_0$ ranges from 191 to 210 and $B2_0$ ranges from 2.1 to 2.9.

It is more reasonable to determine the second initial step number according to the above formula, to avoid excessive large or excessive small second initial step number, thereby balancing the reliability and the heating efficiency of the compression system more favorably and controlling the second electronic expansion valve to achieve the subsequent target steps more rapidly as well.

In some embodiments, $A2_0$ is 201 and $B2_0$ is 2.5, which balances the reliability and the heating efficiency of the compression system furthermore favorably.

As some implementations, in the case where the current environment temperature is less than the fifth preset value, the second initial step number $K2_0$ is determined according to the following formula:

$$K2_0 = C2_0 + D2_0 \overline{T_w} + E2_0 \overline{T_w}^2 + F2_0 \overline{T_w}^3,$$

In the above formula, $K2_0$ is an integer, $C2_0$, $D2_0$, $E2_0$ and $F2_0$ are constants, $\overline{T_w}$ is the average water temperature of the water tank, $C2_0$ ranges from 350 to 382, $D2_0$ ranges from $-4.15$ to $-3.1$, $E2_0$ ranges from 0.16 to 0.26 and $F2_0$ ranges from $-0.0014$ to $-0.0007$.

It is more reasonable to determine the second initial step number according to the above formula, to avoid excessive large or excessive small second initial step number, thereby balancing the reliability and the heating efficiency of the compression system more favorably.

In some embodiments, $C2_0$ is 366, $D2_0$ is $-3.63$, $E2_0$ is 0.215 and $F2_0$ is $-0.001$. In this way, the reliability and the heating efficiency of the compression system can be further balanced more favorably.

Through analysis, the inventors have found that the opening degree of the first electronic expansion valve is comparatively reasonable in a case where the intermediate pressure of the refrigerant after passing through the first electronic expansion valve is substantially equal to the square root of the product of the suction pressure and the exhaust pressure of the compressor. After analysis and fitting, the embodiments of the present disclosure provide some implementations of determining the first target step number of the first electronic expansion valve as follows.

As some implementations, the first target step number $K1_m$ are determined according to the following formula:

$$K1_m = a1_m + b1_m T_e + c1_m \overline{T_w} + d1_m (T_e - \overline{T_w})^2$$

In the above formula, $a1_m$, $b1_m$, $c1_m$, and $d1_m$ are constants, and $T_e$ is the current environment temperature, and $\overline{T_w}$ is the average water temperature of the water tank, $a1_m$ ranges from 217 to 223, $b1_m$ ranges from 5.5 to 5.7, $c1_m$ ranges from $-0.2$ to $-0.1$ and $d1_m$ ranges from 0.01 to 0.02.

The first target step number is determined according to the above formula, which achieves a higher energy efficiency ratio of the compression system.

In some embodiments, $a1_m$ is 222, $b1_m$ is 5.7, $c1_m$ is $-0.16$, and $d1_m$ is 0.02. In this way, the energy efficiency ratio of the compression system can be further improved.

Some implementations of determining the second target steps of the second electronic expansion valve will be introduced below.

As some implementations, the second target steps of the second electronic expansion valve is determined according to the following formula:

$$K2_m = K2_{m(previous)} + \Delta K2$$

In the above formula, $K2_m$ is the second target step determined for this time, $K2_{m(previous)}$ is the second target step determined for the previous time, $\Delta K2=T_x-T_g$—target superheat degree, $T_x$ is the suction temperature of the compressor, and $T_g$ is the temperature of the tube temperature thermometer bulb (for example, refer to FIG. 1) on the inlet pipe of the air-side heat exchanger.

In some embodiments, the target superheat degree is determined according to Table 1 (where G1 to G5 are integers from 0 to 5):

TABLE 1

| Exhaust temperature | Target superheat degree | |
|---|---|---|
| | $T_e > 0$ | $T_e \leq 0$ |
| $T_p \geq 100$ | G1 | G1 |
| $70 \leq T_p < 100$ | G2 | G3 |
| $50 \leq T_p < 70$ | G3 | G4 |
| $T_p < 50$ | G4 | G5 |

In Table 1, Te is the current environment temperature, and Tp is the exhaust temperature of the compressor. In some embodiments, G1, G2, G3, G4 and G5 gradually increase. In this case, it is beneficial to reduce the possibility of the compressor suction operating by carrying a liquid to improve the reliability of the compression system at a low environment temperature; and it is beneficial to improve the heating efficiency of the compression system at a high environment temperature.

Various embodiments in this specification are described in a progressive manner, and each embodiment focuses on description of the differences from other embodiments. For the same or similar parts between various embodiments, reference can be made to each other. As for the embodiments of apparatus, since they substantially correspond to the embodiments of method, the description thereof is relatively simple. For the relevant parts, reference can be made to the description of the embodiments of method.

Figure 5:
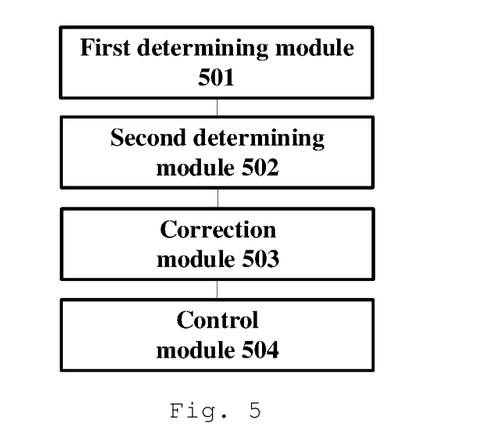
FIG. 5 is a structural schematic view showing a control apparatus for a compression system according to some embodiments of the present disclosure.

FIG. 5 is a structural schematic view showing a control apparatus for a compression system according to some embodiments of the present disclosure.

Here, the compression system comprises a compressor provided between an outdoor first heat exchanger and a second heat exchanger of the water tank, a first electronic expansion valve provided between the second heat exchanger and a flash evaporator, and a second electronic expansion valve provided between the flash evaporator and the first heat exchanger.

The control apparatus for the compression system is configured to perform a first control step for at least one time. As shown in FIG. 5, the control apparatus for the compression system comprises: a first determining module 501 configured to determine a first target step number of the first electronic expansion valve in the first control step for each time; a second determining module 502 configured to determine a temperature difference between the current exhaust temperature of the compressor and the current maximum water temperature of the water tank, after the first electronic expansion valve to is controlled to operate with the first target step number for a first time period in the first control step for each time; a correction module 503 configured to decrease the first target step number by a first correction step number in a case where the temperature difference is less than a first preset value in the first control step for each time, wherein the first preset value is greater than 0 degree Celsius, and the first correction step number is greater than 0 step; a control module 504 configured to control the first electronic expansion valve to operate with the decreased first target step number in the first control step for each time.

Figure 6:
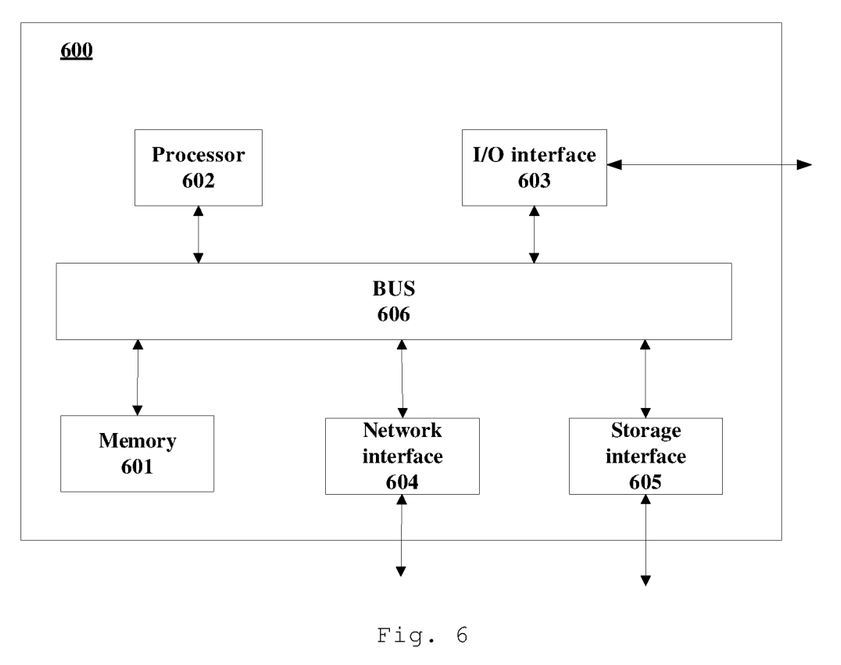
FIG. 6 is a structural schematic view showing a control apparatus for a compression system according to other embodiments of the present disclosure.

FIG. 6 is a structural schematic view showing a control apparatus for a compression system according to other embodiments of the present disclosure.

As shown in FIG. 6, the control apparatus 600 of the compression system comprises a memory 601 and a processor 602 coupled to the memory 601. The processor 602 is configured to perform the method according to any of the above embodiments based on instructions stored in the memory 601.

The memory 601 comprises, for example, a system memory, a fixed nonvolatile storage medium, or the like. The system memory stores, for example, an operation system, an application program, a boot loader, and other programs.

The control apparatus 600 for the compression system in some embodiments further comprises an I/O interface 603, a network interface 604, and a storage interface 605, and the like. These interfaces 603, 604 and 605 therebetween, as well as the memory 601 and the processor 602 therebetween, are connected by a bus 606, for example. The I/O interface 603 provides a connection interface for I/O devices such as a display, a mouse, a keyboard, or a touch screen. The network interface 604 provides a connection interface for various networking devices. The storage interface 605 provides a connection interface for an external storage device such as a SD card or a USB flash drive.

The embodiments of the present disclosure also provide an air energy heat pump water heater, which comprises the compression system and the control apparatus for the compression system according to any of the above embodiments. The compression system is the compression system mentioned in any of the above embodiments.

The embodiments of the present disclosure further provide a computer readable storage medium having computer program instructions stored thereon that, when executed by a processor, implement the control method for a compression system according to any of the above embodiments.

Hereto, various embodiments of the present disclosure have been described in detail. Some details well known in the art are not described to avoid obscuring the concept of the present disclosure. According to the above description, those skilled in the art would fully understand how to implement the technical solutions disclosed here.

Those skilled in the art should understand that, the embodiments of the present disclosure can be provided as a method, a apparatus, or a computer program product. Therefore, embodiments of the present disclosure can take the form of an entirely hardware embodiment, an entirely software embodiment or an embodiment combining both hardware and software. Moreover, the present disclosure takes the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatus (systems) and computer program products according to embodiments of the present disclosure. It should be understood that each process in the flowcharts and/or the functions specified in one or more blocks of the block diagrams is implemented by computer program instructions. The computer program instructions are provided to a processor of a general-purpose computer, a special purpose computer, an embedded processor, or other programmable data processing device to generate a machine, making the instructions executed by a processor of a computer or other programmable data processing device generate means implementing the functions specified in one or more flows of the flowcharts and/or one or more blocks of the block diagrams.

The computer program instructions are stored in a computer readable memory device capable of directing a computer or other programmable data processing device to operate in a specific manner such that the instructions stored in the computer readable memory device produce an article of manufacture comprising an instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments and equivalent substitution of part of the technical features can be made without departing from the scope and spirit of the present disclosure. The scope of the present disclosure is defined by the appended claims.

What is claimed is:

1. A control method for a compression system, the compression system comprising a compressor provided between a first outdoor heat exchanger and a second heat exchanger of a water tank, a first electronic expansion valve provided between the second heat exchanger and a flash evaporator, and a second electronic expansion valve provided between the flash evaporator and the outdoor first heat exchanger;
the control method comprising performing a first control step for N times, wherein performing the first control step for each time comprises:
determining a first target step number of the first electronic expansion valve, the first target step number being a target opening degree;
determining a temperature difference between a current exhaust temperature of the compressor and a current maximum water temperature of a water tank, after controlling the first electronic expansion valve to operate with the first target step number for a first time period;
decreasing the first target step number by a first correction step number in a case where the temperature difference is less than a first preset value, wherein the first preset value is greater than 0 degree Celsius and the first correction step number is greater than 0 step; and
controlling the first electronic expansion valve to operate with the decreased first target step number;
wherein the temperature difference in the first control step for each time is less than the first preset value, and the first correction step number in the first control step for i-th time is greater than the first correction step number in the first control step for (i−1)-th time, wherein N is greater than or equal to 2, and $2 \leq i \leq N$.

2. The control method according to claim 1, wherein in a case where i is any integer from 2 to N, a first difference between the first correction step number in the first control step for i-th time and the first correction step number in the first control step for (i−1)-th time is the same.

3. The control method according to claim 1, further comprising: performing a second control step for at least one time after performing the first control step for at least one time, wherein performing the second control for each time comprises:
determining the first target step number of the first electronic expansion valve;
determining the temperature difference after controlling the first electronic expansion valve to operate with the first target step number for a second time period;
decreasing the first target step number by the first correction step number in the first control step for previous time in a case where the temperature difference is greater than or equal to the first preset value and less than a second preset value, wherein the second preset value is greater than the first preset value; and
controlling the first electronic expansion valve to operate with the decreased first target step number.

4. The control method according to claim 3, further comprising: performing a third control step for at least one time after performing the second control step for at least one time, wherein performing the third control step for each time comprises:
determining the first target step number of the first electronic expansion valve;
determining the temperature difference after controlling the first electronic expansion valve to operate with the first target step number for a third time period;
increasing the first target step number by a second correction step number in a case where the temperature difference is greater than or equal to the second preset value, wherein the second correction step number is greater than 0 step; and
controlling the first electronic expansion valve to operate with the increased first target step number.

5. The control method according to claim 4, wherein the third control step for at least one time comprises the third control step for M times, the temperature difference in the third control step for each time is greater than or equal to the second preset value, and the second correction step number in the third control step for j-th time is greater than the second correction step number in the third control step for (j−1)-th time, wherein M is greater than or equal to 2, and $2 \leq j \leq M$.

6. The control method according to claim 5, wherein in a case where j is any integer from 2 to M, a second difference between the second correction step number in the third control step for j-th time and the second correction step number in the third control step for (j−1)-th time is the same.

7. The control method according to claim 3, wherein the first preset value is 10 degrees Celsius, and the second preset value is 15 degrees Celsius.

8. The control method according to claim 1, wherein before performing the first control step for at least one time, the control method further comprises:
determining a first initial step number of the first electronic expansion valve and a second initial step number of the second electronic expansion valve according to a current environment temperature and a current average water temperature of the water tank, in response to startup of the compressor; and
controlling the first electronic expansion valve to start operating with the first initial step number and controlling the second electronic expansion valve to start operating with the second initial step number.

9. The control method according to claim 8, wherein determining a first initial step number of the first electronic expansion valve and a second initial step number of the second electronic expansion valve according to a current environment temperature and a current average water temperature of the water tank comprises:
determining that the first initial step number is a fixed value, in a case where the current environment temperature is less than a third preset value or greater than or equal to a fourth preset value, wherein the third preset value and the fourth preset value are greater than 0 degree Celsius; and
determining the first initial step number according to the current average water temperature, in a case where the current environment temperature is greater than or equal to the third preset value and less than the fourth preset value.

10. The control method according to claim 9, wherein determining the first initial step number according to the current average water temperature comprises:
determining the first initial step number $K1_0$ according to the following formula:

$$K1_0 = B1_0 + C1_0 \overline{T_w} + D1_0(\overline{T_w}-20)^2 + E1_0(\overline{T_w}-20)^3$$

wherein $K1_0$ is an integer, $B1_0$, $C1_0$, $D1_0$ and $E1_0$ are constants, $\overline{T_w}$ is the current average water temperature, $B1_0$ ranges from 267 to 310, $C1_0$ ranges from 4.3 to 6.1, $D1_0$ ranges from $-0.17$ to $-0.09$, and $E1_0$ ranges from 0.0006 to 0.0013.

11. The control method according to claim 9, wherein:
the fixed value ranges from 250 steps to 450 steps; and
the third preset value is 10 degrees Celsius, and the fourth preset value is 30 degrees Celsius.

12. The control method according to claim 8, wherein determining the first initial step number of the first electronic expansion valve and the second initial step number of the second electronic expansion valve according to a current environment temperature and a current average water temperature of the water tank comprises:
determining that the second initial step number is positively correlated with the current environment temperature in a case where the current environment temperature is greater than or equal to a fifth preset value, wherein the fifth preset value is less than 0 degree Celsius; and
determining that the second initial step number is positively correlated with the current average water temperature in a case where the current environment temperature is less than the fifth preset value.

13. The control method according to claim 12, wherein in the case where the current environment temperature is greater than or equal to the fifth preset value, the second initial step number $K2_0$ is determined according to the following formula:

$$K2_0 = A2_0 + B2_0 T_e$$

wherein $K2_0$ is an integer, $A2_0$ and $B2_0$ are constants, $T_e$ is the current environment temperature, $A2_0$ ranges from 191 to 210, and $B2_0$ ranges from 2.1 to 2.9; and/or
in the case where the current environment is less than the fifth preset value, the second initial step number $K2_0$ is determined cording to the following formula:

$$K2_0 = C2_0 + C2_0 \overline{T_w} + E2_0 \overline{T_w}^2 + F2_0 \overline{T_w}^3$$

wherein $K2_0$ is an integer, $C2_0$, $D2_0$, $E2_0$, and $F2_0$ are constants, $\overline{T_w}$ is the current average water temperature, $C2_0$ ranges from 350 to 382, $D2_0$ ranges from $-4.15$ to $-3.1$, $E2_0$ ranges from 0.16 to 0.26, and $F2_0$ ranges from $-0.0014$ to $-0.0007$.

14. The control method according to claim 1, wherein the first target step number is determined according to a current environment temperature and a current average water temperature of the water tank, wherein the first target step number $K1_m$ is determined according to the following formula:

$$K1_m = a1_m + b1_m T_e + c1_m \overline{T_w} + d1_m(T_e - \overline{T_w})^2$$

wherein $a1_m$, $b1_m$, $c1_m$, and $d1_m$ are constants, and $T_e$ is the current temperature, $\overline{T_w}$ is the average water temperature, $a1_m$ ranges from 217 to 223, $b1_m$ ranges from 5.5 to 5.7, $c1_m$ ranges from $-0.2$ to $-0.1$, and $d1_m$ ranges from 0.01 to 0.02.

15. The control method according to claim 14, wherein $a1_m$ is 222, $b1_m$ is 5.7, $c1_m$ is $-0.16$, and $d1_m$ is 0.02.

16. A control apparatus for a compression system, comprising:
a memory; and
a processor coupled to the memory and configured to perform the control method for the compression system according to claim 1 based on instructions stored in the memory.

17. An air energy heat pump water heater, comprising:
the control apparatus for the compression system according to claim 16; and
the compression system.

18. A non-transitory computer-readable storage medium comprising computer program instructions, wherein the computer program instructions, when executed by a processor, implement the control method according to claim 1.

19. A control method for a compression system, the compression system comprising a compressor provide between a first outdoor heat exchanger and a second heat exchanger of a water tank, a first electronic expansion valve provided between the second heat exchanger and a flash evaporator, and a second electronic expansion valve provided between the flash evaporator and the outdoor first heat exchanger;
the control method comprising performing a first control step for at least one time, wherein performing the first control step for each time comprises:
determining a first target step number of the first electronic expansion valve, the first target step number being a target opening degree;
determining a temperature difference between a current exhaust temperature of the compressor and a current maximum water temperature of a water tank, after controlling the first electronic expansion valve to operate with the first target step number for a first time period;
decreasing the first target step number by a first correction step number in a case where the temperature difference is less than a first preset value, wherein the first preset value is greater than 0 degree Celsius and the first correction step number is greater the 0 step; and
controlling the first electronic expansion valve to operate with the decreased first target step number;
the control method further comprising performing a second control step for at least one time after performing the first control step for at least one time, wherein performing the second control for each time comprises:
determining the first target step number of the first electronic expansion valve;

determining the temperature difference after controlling the first electronic expansion valve to operate with the first target step number for a second time period;

decreasing the first target step number by the first correction step number in the first control step for previous time in a case where the temperature difference is greater than or equal to the first preset value and less than a second preset value, wherein the second preset value greater than the first preset value; and controlling the first electronic expansion valve to operate with the decreased first target step number.

20. A control method for a compression system, the compression system comprising a compressor provided between a first outdoor heat exchanger and a second heat exchanger of a water tank, a first electronic expansion valve provided between the second heat exchanger and a flash evaporator, and a second electronic expansion valve provided between the flash evaporator and the outdoor first heat exchanger;

the control method comprising performing a first control step for at least one time, wherein performing the first control step for each time comprises:

determining a first target step number of the first electronic expansion valve, the first target step number being a target opening degree;

determining a temperature difference between a current exhaust temperature of the compressor and a current maximum water temperature of a water tank, after controlling the first electronic expansion valve to operate with the first target step number for a first time period;

decreasing the first target step number by a first correction step number in a case where the temperature difference is less than a first preset value, wherein the first preset value is greater than 0 degree Celsius and the first correction step number is greater than 0 step; and controlling the first electronic expansion valve to operate with the decreased first target step number;

wherein before performing the first control step for at least one time, the control method further comprises:

determining a first initial step number of the first electronic expansion valve and a second initial step number of the second electronic expansion valve according to a current environment temperature and a current average water temperature of the water tank in response to startup of the compressor, comprising:

determining that the first initial step number is a fixed value, in a case where the current environment temperature is less than a third preset value or greater than or equal to a fourth preset value, wherein the third preset value and the fourth preset value are greater than 0 degree Celsius, and determining the first initial step number according to the current average water temperature, in a case where the current environment temperature is greater than or equal to the third preset value and less than the fourth preset value; and controlling the first electronic expansion valve to start operating with the first initial step number and controlling the second electronic expansion valve to start operating with the second initial step number.

* * * * *

UNITED STATES PATENT AND TRADEMARK OFFICE
CERTIFICATE OF CORRECTION

PATENT NO. : 12,366,379 B2
APPLICATION NO. : 18/280491
DATED : July 22, 2025
INVENTOR(S) : Fan Shi et al.

Page 1 of 1

It is certified that error appears in the above-identified patent and that said Letters Patent is hereby corrected as shown below:

In the Claims

Column 15, Line 65, Claim 13, delete "$K2_0=C2_0+C2_0\overline{T}_w+E2_0\overline{T}_w^2+F2_0\overline{T}_w^3$" and insert -- $K2_0=C2_0+D2_0\overline{T}_w+E2_0\overline{T}_w^2+F2_0\overline{T}_w^3$ --

Column 16, Line 36, Claim 19, delete "provide" and insert -- provided --

Signed and Sealed this
Ninth Day of September, 2025

Coke Morgan Stewart
*Acting Director of the United States Patent and Trademark Office*